(12) United States Patent
Her et al.

(10) Patent No.: US 9,896,075 B2
(45) Date of Patent: Feb. 20, 2018

(54) PULSATION DAMPING DEVICE OF HYDRAULIC BRAKE SYSTEM

(71) Applicant: MANDO CORPORATION, Pyeongtaek-si, Gyeonggi-do (KR)

(72) Inventors: Young-Chae Her, Incheon (KR); Jae-Young Jeon, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/254,838

(22) Filed: Sep. 1, 2016

(65) Prior Publication Data

US 2017/0057478 A1  Mar. 2, 2017

(30) Foreign Application Priority Data

Sep. 2, 2015  (KR) .......................... 10-2015-0124029

(51) Int. Cl.
*B60T 8/40* (2006.01)
*B60T 8/42* (2006.01)
*B60T 8/48* (2006.01)

(52) U.S. Cl.
CPC ........... *B60T 8/4068* (2013.01); *B60T 8/4291* (2013.01); *B60T 8/4872* (2013.01)

(58) Field of Classification Search
CPC ..... B60T 8/4068; B60T 8/4291; B60T 8/4872
USPC ............................. 303/10, 87; 138/26, 30, 31
See application file for complete search history.

(56) References Cited

U.S. PATENT DOCUMENTS

| | | | |
|---|---|---|---|
| 5,540,486 A * | 7/1996 | Linkner .................. | B60T 8/348 137/565.34 |
| 5,921,636 A | 7/1999 | Roberts | |
| 6,164,336 A * | 12/2000 | Pasquet ................ | B60T 8/4068 138/26 |
| 9,096,200 B2 * | 8/2015 | Zeoli ......................... | B60T 7/22 |
| 2012/0133201 A1 | 5/2012 | Zeoli et al. | |

(Continued)

FOREIGN PATENT DOCUMENTS

| DE | 19544221 A1 | 6/1997 |
|---|---|---|
| DE | 10318613 B3 | 1/2005 |

(Continued)

OTHER PUBLICATIONS

Korean Office Action dated Jun. 20, 2016 issued in Korean Patent Application No. 10-2015-0124029.

(Continued)

*Primary Examiner* — Thomas J Williams
*Assistant Examiner* — Mariano Sy
(74) *Attorney, Agent, or Firm* — McDermott Will & Emery LLP

(57) ABSTRACT

Disclosed herein is a pulsation damping device of a hydraulic brake system. The pulsation damping device of a hydraulic brake system which attenuates a pressure pulsation of brake oil discharged from a pump comprise a sleeve inserted into a bore which communicates with an inport into which the brake oil is introduced and an outport through which the brake oil is discharged, wherein one end of the sleeve is open and the other end is closed, a damping member accommodated in the sleeve and hollowed to form a damping space therein, and a stopper member configured to block one open end of the bore and coupled to an opening of the sleeve.

11 Claims, 4 Drawing Sheets

(56) References Cited

U.S. PATENT DOCUMENTS

| | | | |
|---|---|---|---|
| 2013/0062934 A1* | 3/2013 | Daher | B60T 15/028 |
| | | | 303/10 |
| 2015/0360662 A1* | 12/2015 | Doh | B60T 13/148 |
| | | | 303/87 |
| 2016/0001754 A1* | 1/2016 | Kim | B60T 13/148 |
| | | | 303/87 |
| 2017/0066423 A1* | 3/2017 | Her | B60T 8/4068 |

FOREIGN PATENT DOCUMENTS

| | | |
|---|---|---|
| DE | 102015005436 A1 | 11/2015 |
| JP | H2-225802 A | 9/1990 |
| JP | 2009-234401 A | 10/2009 |
| JP | 2011051469 A | 3/2011 |
| JP | 2013147176 A | 8/2013 |
| KR | 10-1249368 B1 | 4/2013 |
| KR | 2014-0103469 A | 8/2014 |

OTHER PUBLICATIONS

German Office Action dated Sep. 21, 2017 issued in German Patent Application No. 102016216503.8.

* cited by examiner

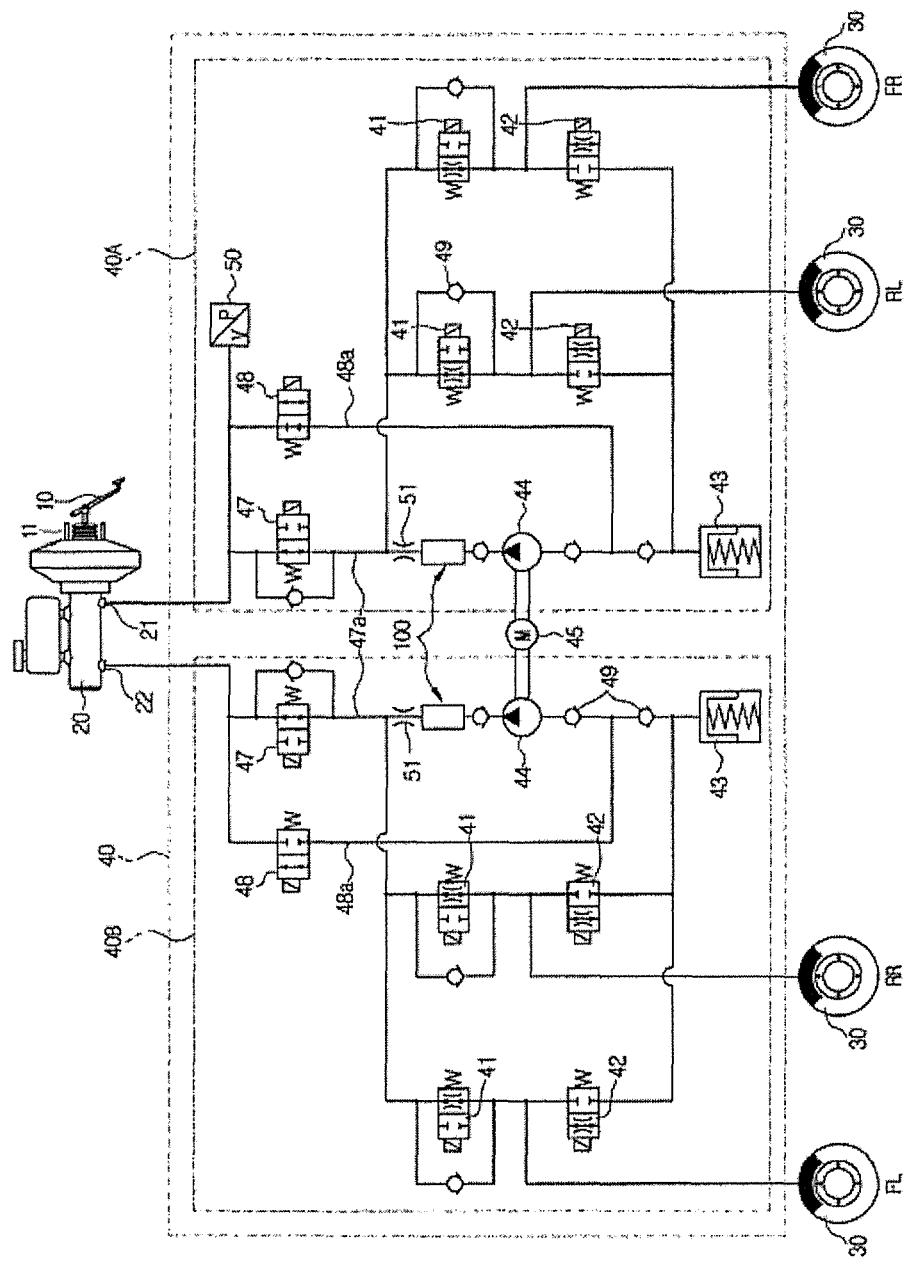
[Fig. 1]

[Fig 2]
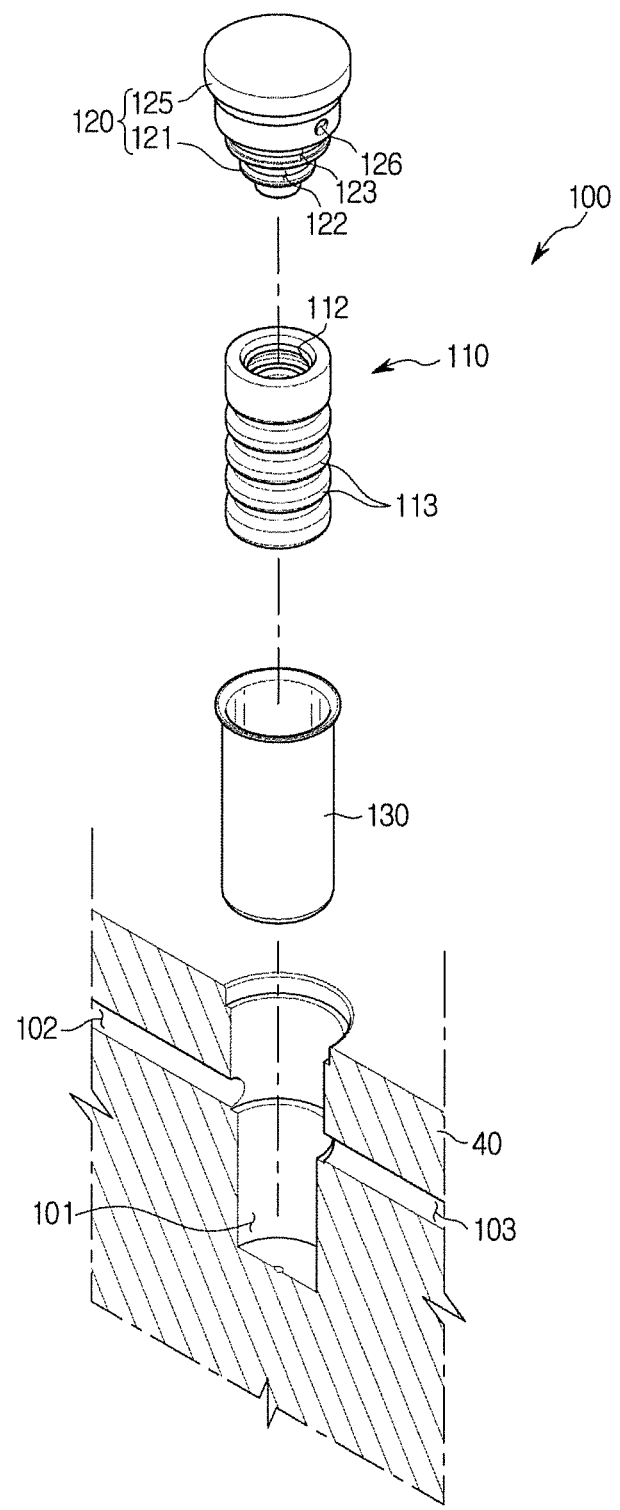

[Fig 3]
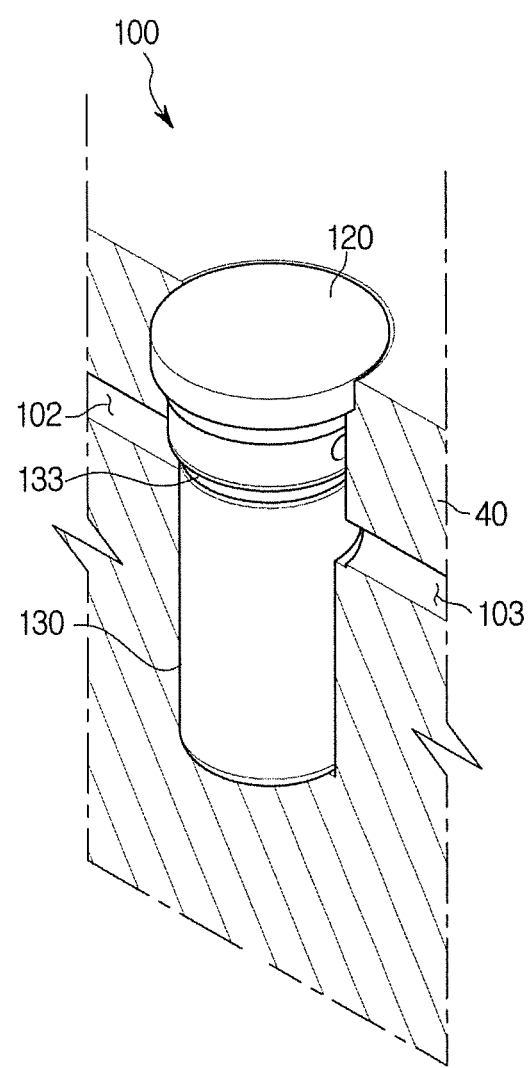

[Fig 4]
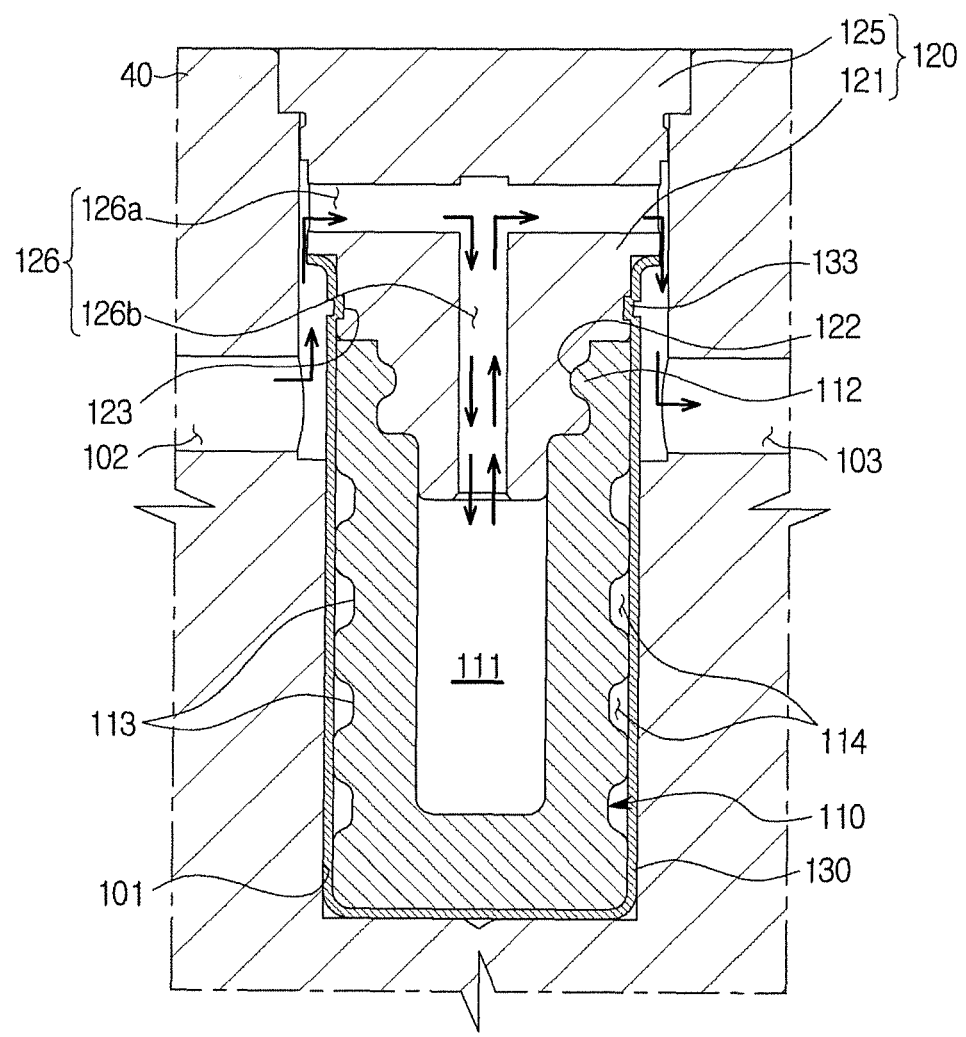

PULSATION DAMPING DEVICE OF HYDRAULIC BRAKE SYSTEM

CROSS-REFERENCE TO RELATED APPLICATION

This application claims the benefit of Korean Patent Application No. 2015-0124029, filed on Sep. 2, 2015 in the Korean Intellectual Property Office, the disclosure of which is incorporated herein by reference.

BACKGROUND

1. Field

Embodiments of the present disclosure relate to a hydraulic brake system, and more particularly, to a pulsation damping device of a hydraulic brake system which attenuates a pressure pulsation of brake oil discharged from a pump.

2. Description of the Related Art

In general, in order to control brake hydraulic pressure to be transferred to a brake of a vehicle, a hydraulic brake system includes a modulator block, in which a plurality of solenoid valves, a low pressure accumulator in which oil is temporarily stored, a pump disposed to be connected to an outlet of the low pressure accumulator for pumping the oil stored in the low pressure accumulator, and a motor for driving the pump are installed, and an electronic control unit (ECU) for controlling components by which the modulator block is electrically operated.

Such a hydraulic brake system adopts and uses various structures including a pulsation damping device having a predetermined damping space for attenuating a pressure pulsation which is generated because hydraulic pressure of brake oil discharged from a pump is at high pressure, an orifice portion at an outport through which brake oil is discharged via the pulsation damping device, etc. For example, a generally known pulsation damping device is formed to attenuate a pressure pulsation generated according to pressure discharged from a pump by having a damping space, a spring provided in the damping space, a piston elastically supported by the spring, a sealing member for shielding the damping space from the outside, etc.

However, since a structure for installation of the above-described pulsation damping device is complex, there are problems in that a manufacturing process is difficult and cost is also increased. Further, since a structure in which the pressure pulsation is attenuated using the spring is formed, there is a problem in that a pressure pulsation attenuation function is not smoothly performed because durability of the spring or the like is degraded when the spring is used for a long time.

SUMMARY

Therefore, it is an aspect of the present disclosure to provide a pulsation damping device of a hydraulic brake system having a simple structure to be easily installed and capable of efficiently attenuating a pressure pulsation.

Additional aspects of the disclosure will be set forth in part in the description which follows and, in part, will be obvious from the description, or may be learned by practice of the disclosure.

In accordance with one aspect of the present disclosure, a pulsation damping device of a hydraulic brake system which attenuates a pressure pulsation of brake oil discharged from a pump, the device comprising: a sleeve inserted into a bore which communicates with an inport into which the brake oil is introduced and an outport through which the brake oil is discharged, wherein one end of the sleeve is open and the other end is closed; a damping member accommodated in the sleeve and hollowed to form a damping space therein; and a stopper member configured to block one open end of the bore and coupled to an opening of the sleeve.

The sleeve includes a shoulder portion which extends from the opening, and the stopper member includes a step corresponding to the shoulder portion.

A concave-convex portion is formed on an outer circumferential surface of the damping member in a longitudinal direction; and an auxiliary damping space is formed between the sleeve and the concave-convex portion.

The stopper member includes a first coupling portion which is coupled to the damping member for sealing the damping space and a second coupling portion which is coupled to the sleeve for sealing between the damping space and the auxiliary damping space.

The damping member is positioned under the second coupling portion.

The stopper member includes: an insertion portion inserted into and coupled to a hollow portion of the damping member; and a cap portion integrally formed with the insertion portion and configured to block the one open end of the bore.

At least one first coupling groove or first coupling protrusion is formed in an outer circumferential surface of the insertion portion; and a coupling protrusion which fits the first coupling groove or a coupling groove which couples with the first coupling protrusion is formed on inner circumferential surface of the damping member into which the insertion portion is inserted.

The stopper member includes a second coupling groove provided in an outer surface thereof to be coupled with the sleeve; and the sleeve includes a hook portion which enters the second coupling groove and is deformed to be caught at the second coupling groove.

The damping member is formed of a rubber material to be elastically deformed.

A flow path by which the inport and the outport are in communication with the damping space is formed in the stopper member.

A space through which the brake oil is introduced and discharged is formed between the stopper member and the bore in a region in which the flow path passing through the stopper member is formed.

The bore includes a lower bore in which a lower portion of the sleeve is accommodated and an upper bore in which the shoulder portion of the sleeve is accommodated; inner diameter of the lower bore is provided to be smaller than inner diameter of the upper bore; and a space through which the brake oil is introduced and discharged is formed between the sleeve and the upper bore in a region in which the inport and the outport are provided.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a hydraulic circuit diagram schematically illustrating a hydraulic brake system provided with a pulsation damping device according to an exemplary embodiment of the present disclosure.

FIG. 2 is a perspective view of an assembly illustrating a state in which a pulsation damping device provided in a hydraulic brake system according to an exemplary embodiment of the present disclosure is being assembled in a modulator block.

FIG. 3 is a perspective view of the assembly shown in FIG. 2.

FIG. 4 is a cross-sectional view illustrating a flow of brake oil whose pressure pulsation is attenuated by the pulsation damping device of the hydraulic brake system.

DETAILED DESCRIPTION

Hereinafter, embodiments of the present disclosure will be described in detail with reference to accompanying drawings. The accompanying drawings are examples which provide the concept of the present disclosure to those skilled in the art. The present disclosure is not limited to the accompanying embodiments and may be implemented in different forms. Parts irrelevant to description are omitted in the drawings in order to clearly describe the present disclosure, and widths, lengths, and thicknesses of components in the drawings may be exaggerated for convenience of description.

FIG. 1 is a hydraulic circuit diagram schematically illustrating a hydraulic brake system provided with a pulsation damping device according to an exemplary embodiment of the present disclosure.

Referring to FIG. 1, the hydraulic brake system includes a brake pedal 10 to which an operating force of a driver is applied, a brake booster 11 which increases pedal effort due to the pedal effort of the brake pedal 10, using a pressure difference between vacuum pressure and atmospheric pressure, a master cylinder 20 which generates pressure using the brake booster 11, a first hydraulic circuit 40A which connects a first port 21 of the master cylinder 20 and wheel cylinders 30 provided on two wheels FR and RL and controls hydraulic pressure transmission, and a second hydraulic circuit 40B which connects a second port 22 of the master cylinder 20 and wheel cylinders 30 provided on the two remaining wheels FL and RR and controls hydraulic pressure transmission. The first hydraulic circuit 40A and the second hydraulic circuit 40B are compactly installed in a modulator block 40.

Each of the first hydraulic circuit 40A and the second hydraulic circuit 40B includes solenoid valves 41 and 42 for controlling brake hydraulic pressure transferred to two pairs of wheel cylinders 30, a pump 44 for suctioning and pumping brake oil discharged from wheel cylinders 30 or brake oil discharged from the master cylinder 20 by driving a motor 45, a low pressure accumulator 43 for temporarily storing the brake oil discharged from the wheel cylinders 30, a main flow path 47a which connects an outlet of the pump 44 to the master cylinder 20, an auxiliary flow path 48a which guides the brake oil from the master cylinder 20 to an inlet of the pump 44 to be suctioned, and an electronic control unit (ECU) (not shown) which controls driving of the plurality of solenoid valves 41 and 42 and the motor 45.

Here, as shown in the drawing, the solenoid valves 41 and 42, the low pressure accumulator 43, the pump 44, the main flow path 47a, and the auxiliary flow path 48a are provided in each of the first and second hydraulic circuits 40A and 40B.

More specifically, the plurality of solenoid valves 41 and 42 are related to upstream side and downstream side of each of the wheel cylinders 30 and are classified as a normal open type solenoid valve 41, which is disposed at the upstream side of each wheel cylinder 30 and usually maintains an open state, and a normal closed type solenoid valve 42 which is disposed at the downstream side of each wheel cylinder 30 and usually maintains a closed state. Opening and closing operations of the solenoid valves 41 and 42 are controlled by the ECU, and the normal closed type solenoid valve 42 is opened by decompression braking so that brake oil discharged from the wheel cylinder 30 is temporarily stored in the low pressure accumulator 43.

The pump 44 is driven by the motor 45 and suctions and discharges the brake oil stored in the low pressure accumulator 43, and hydraulic pressure is thus transferred to the wheel cylinder 30 or the master cylinder 20.

Further, a normal open type solenoid valve 47 (hereinafter, a TC valve) for a traction control system (TCS) is installed in the main flow path 47a which connects the master cylinder 20 to an outlet of the pump 44. The TC valve 47 usually maintains an open state and, during a general braking using the brake pedal 10, transfers brake hydraulic pressure generated from the master cylinder 20 to the wheel cylinder 30 through the main flow path 47a.

Further, the auxiliary flow path 48a is branched from the main flow path 47a to guide brake oil discharged from the master cylinder 20 to be suctioned at the inlet of the pump 44, and a shuttle valve 48 is installed on the auxiliary flow path 48a so that the brake oil is only introduced into the inlet of the pump 44. The shuttle valve 48 which is electrically operated is installed in the middle of the auxiliary flow path 48a, is usually closed, and is operated to be open in a TCS mode.

Meanwhile, the unmentioned reference number '49' is a check valve installed at a suitable position in a flow path for preventing a backflow of brake oil, the reference number '50' is a pressure sensor which detects a brake pressure transferred to the TC valve 47 and the shuttle valve 48, and the reference number '51' is an orifice.

When braking is performed in the hydraulic brake system described above, a pressure pulsation is generated from a hydraulic pressure pumped from the pump 44 according to operation of the motor 45. Thus, according to one embodiment of the present disclosure, a pulsation damping device 100 connected to the outlet of the pump 44 of each of the hydraulic circuits 40A and 40B is provided for attenuating a pressure pulsation.

FIG. 2 is a perspective view of an assembly illustrating a state in which a pulsation damping device provided in a hydraulic brake system according to an exemplary embodiment of the present disclosure is being assembled in a modulator block, FIG. 3 is a perspective view of the assembly shown in FIG. 2, and FIG. 4 is a cross-sectional view illustrating a flow of brake oil whose pressure pulsation is attenuated by the pulsation damping device of the hydraulic brake system.

Referring to FIGS. 2 to 4, the pulsation damping device 100 according to one embodiment of the present disclosure is provided at an inport 102 in which brake oil discharged from the pump 44 (see FIG. 1) is introduced and a bore 101 which communicates with an outport 103 through which brake oil is discharged. Here, as the pulsation damping device 100 is provided in the main flow path 47a (see FIG. 1), the inport 102 is connected to the main flow path 47a connected to the outlet the pump 44, and the outport 103 is connected to the main flow path 47a connected to the master cylinder 20. The pulsation damping device 100 includes a damping member 110 inserted into and provided in the bore 101 and a sleeve 130 which surrounds a stopper member 120 inserted into the damping member 110 and blocks an opening of the bore 101 whose one side is open and the damping member 110 and is coupled to the stopper member 120.

The damping member 110 is formed in a hollow cylindrical shape, of which one side is open so that a damping space 111 is formed therein, and is inserted into the bore 101. More specifically, an outer circumferential surface of the damping member 110 is inserted to be spaced a predetermined gap from the bore 101. Here, a concave-convex portion 113 is formed on the outer circumferential surface of the damping member 110 in a longitudinal direction. When the damping member 110 is coupled to the sleeve 130, the concave-convex portion 113 forms an auxiliary damping space 114 between the sleeve 130 and the concave-convex portion 113. The auxiliary damping space 114 will be described again below.

The stopper member 120 is coupled to an opening of the sleeve 130. A lower portion of the stopper member 120 is accommodated in the sleeve 130, and an upper portion of the stopper member 120 protrudes above the sleeve 130.

Further, the stopper member 120 includes a first coupling portion which is coupled to the damping member 110 for sealing the damping space 111 and a second coupling portion which is coupled to the sleeve 130 for sealing between the damping space 111 and the auxiliary damping space 114. Here, the damping member 110 may be positioned under the second coupling portion.

Meanwhile, a coupling protrusion 112 is formed in a hollow portion of the damping member 110 coupled to the stopper member 120. As the coupling protrusion 112 is for maintaining a close coupling relationship with the stopper member 120, the coupling protrusion 112 serves to prevent leakage of brake oil between the stopper member 120 and the damping member 110. Such coupling structure of the coupling protrusion 112 and the stopper member 120 will be described again below. The damping member 110 is formed of a rubber material and may be elastically deformed.

The stopper member 120 is installed to be coupled to the damping member 110 to block one open end of the bore 101. A flow path 126 by which the inport 102 and the outport 103 are in communication with the damping space 111 is formed in the stopper member 120. Here, although the flow path 126 can be formed in any type as long as the inport 102 and the outport 103 communicate with the damping space 111, it is preferable that the flow path 126 be positioned to be spaced apart from the inport 102 and the outport 103 so that brake oil detours to be discharged to the outport 103 for effective pulsation damping. The stopper member 120 includes an insertion portion 121 to be inserted into the hollow portion of the damping member 110 and a cap portion 125 integrally formed with the insertion portion 121 to block the one open end of the bore 101.

The insertion portion 121 is inserted into the hollow portion of the damping member 110, and the damping space 111 is thus formed in the damping member 110. Referring to the drawings, one side of the insertion portion 121 is closely coupled to the inside of the damping member 110, and the other side is coupled to the sleeve 130 to be described below. Accordingly, a first coupling groove 122 to be coupled to the damping member 110 and a second coupling groove 123 to be coupled to the sleeve 130 are formed in the stopper member 120.

The first coupling groove 122 is formed to have a concave shape on an outer circumferential surface of the insertion portion 121. At least one first coupling groove 122 may be formed in the insertion portion 121. The coupling protrusion 112 which fits the first coupling groove 122 is formed on an inner circumferential surface of the damping member 110 into which the insertion portion 121 is inserted. That is, the damping member 110 is coupled to the stopper member 120 by inserting the coupling protrusion 112 into the first coupling groove 122. Referring to the drawings, in addition to coupling of the first coupling groove 122 with the coupling protrusion 112, a complementary structure, i.e., a structure having a concave groove formed in the damping member 110 and a part of the insertion portion 121 inserted into and coupled to the groove, may also maintain a close coupling state between the damping member 110 and the stopper member 120. Thus, leakage of brake oil between the stopper member 120 and the damping member 110 can be prevented.

The second coupling groove 123 is formed around the other side of the insertion portion 121, i.e., above the first coupling groove 122. The second coupling groove 123 is formed along a perimeter of an outer surface of the insertion portion 121. Here, a hook portion 133, which enters the second coupling groove 123 and is deformed to be caught at the second coupling groove 123, is provided on the sleeve 130. That is, after the stopper member 120 enters the sleeve 130, the hook portion 133 is formed by deforming the stopper member 120, and thus the stopper member 120 and the sleeve 130 may be fixed. Thus, since the stopper member 120 is installed to be in contact with each of the damping member 110 and the sleeve 130, the stopper member 120 provides sealing between the damping space 111 and the auxiliary damping space 114.

The cap portion 125 is installed to block the one open end of the bore 101. That is, the cap portion 125 prevents oil introduced into the bore 101 from leaking to the outside. The flow path 126 by which the inport 102 and the outport 103 are in communication with the damping space 111 is formed in the cap portion 125. Here, the flow path 126 may be formed with a first flow path 126a which connects the inport 102 to the outport 103 and a second flow path 126b which connects the first flow path 126a to the damping space 111.

Further, a space through which brake oil is introduced and discharged may be formed between the stopper member 120 and the bore 101 in a region in which the first flow path 126a passing through the stopper member 120 is formed.

In addition, the bore 101 includes a lower bore in which a lower portion of the sleeve 130 is accommodated and an upper bore in which a shoulder portion of the sleeve 130 is accommodated, inner diameter of the lower bore is provided to be smaller than inner diameter of the upper bore, and a space through which brake oil is introduced and discharged may be formed between the sleeve 130 and the upper bore in a region in which the inport 102 and the outport 103 are provided.

The sleeve 130 surrounds the damping member 110 and is pressed to be inserted into and coupled to the stopper member 120. Here, as described above, the sleeve 130 includes the hook portion 133 which is deformed to be coupled to the second coupling groove 123. Since the structure of the hook portion 133 is described above, a detailed description thereof will be omitted. Further, the sleeve 130 is pressed to be inserted into and installed on the bore 101 so that brake oil flows from the inport 102 to the outport 103 through the flow path 126 formed in the stopper member 120. Since the sleeve 130 surrounds the damping member 110 and is coupled to the stopper member 120, the pulsation damping device 100 according to one embodiment of the present disclosure may be provided as one assembly. Accordingly, the pulsation damping device 100 may be easily installed in the bore 101.

Meanwhile, since the sleeve 130 is formed to be in contact with and surround an outer surface of the damping member 110, the auxiliary damping space 114 is formed between the sleeve 130 and the concave-convex portion 113 of the damping member 110. That is, a concave portion of the concave-convex portion 113 is formed as the auxiliary damping space 114. Thus, a pressure pulsation of high hydraulic pressure introduced from the inport 102 is first attenuated by the damping space 111, the pressure pulsation is attenuated a second time by the auxiliary damping space 114, and attenuating of the pressure pulsation is thus effectively performed. Further, since the sleeve 130 is provided to surround the damping member 110, durability of the damping member 110 is improved.

Further, the sleeve 130 further includes the shoulder portion which extends from the opening. The shoulder portion is provided to extend from an end of the opening of the sleeve 130 to the outside.

In addition, the stopper member 120 includes a step corresponding to the shoulder portion. That is, the stopper member 120 includes a portion which is inserted into an inner circumferential surface of the shoulder portion and a portion which is pressed against an upper surface of the shoulder portion.

Subsequently, a state in which a pressure pulsation is attenuated by the pulsation damping device will be described.

Brake oil discharged at high pressure by pumping of the pump 44 is transferred to the pulsation damping device 100 through the inport 102. The brake oil introduced through the inport 102 flows into the damping member 110, i.e., the damping space 111, through the flow path 126 formed in the stopper member 120, a pressure pulsation of the brake oil is attenuated by elastically deforming the damping member 110, and the brake oil is discharged to the outport 103. Here, the pressure pulsation is attenuated by mitigating impacts by the damping member 110 formed of a rubber material, and the pressure pulsation is also more effectively attenuated by the auxiliary damping space 114 formed between the sleeve 130 and the damping member 110.

As is apparent from the above description, it is advantageous that a pressure pulsation can be attenuated because the pulsation damping device of a hydraulic brake system according to one embodiment of the present disclosure includes a damping member in which a damping space is formed, and compared to a conventional case, installation time and cost can also be reduced because the damping member is provided with one assembly having a simple structure.

Further, it is advantageous that a pressure pulsation can be effectively attenuated by providing a separate auxiliary damping space between a damping member and a sleeve and, since damage is prevented by limiting excessive deformation even at high pressure, function degradation caused by a decrease in durability can be prevented even when used for a long time.

Meanwhile, it is advantageous that coupling is easy because a hook portion is coupled with a stopper member by deforming a sleeve, and assembly is also easy because the stopper member and a damping member to be elastically deformed are assembled in a coupling structure having a groove and a protrusion.

As described above, while the present disclosure has been described with reference to specific embodiments and drawings, the present disclosure is not limited thereto. It should be clear to those skilled in the art that various modifications and alterations may be made without departing from the spirit and scope of the present disclosure and equivalents of the appended claims.

[Reference Numerals]

| | |
|---|---|
| 100: PULSATION DAMPING DEVICE | 102: INPORT |
| 103: OUTPORT | 110: DAMPING MEMBER |
| 111: DAMPING SPACE | 112: COUPLING PROTRUSION |
| 113: CONCAVE-CONVEX PORTION | 114: AUXILIARY DAMPING SPACE |
| 120: STOPPER MEMBER | 122: FIRST COUPLING GROOVE |
| 123: SECOND COUPLING GROOVE | 126: FLOW PATH |
| 130: SLEEVE | 133: HOOK PORTION |

What is claimed is:

1. A pulsation damping device of a hydraulic brake system which attenuates a pressure pulsation of brake oil discharged from a pump, the device comprising:
    a sleeve inserted into a bore which communicates with an inport into which the brake oil is introduced and an outport through which the brake oil is discharged, wherein one end of the sleeve is open and the other end is closed;
    a damping member accommodated in the sleeve and hollowed to form a damping space therein; and
    a stopper member configured to block one open end of the bore and coupled to an opening of the sleeve,
    wherein:
    the stopper member includes a second coupling groove provided in an outer surface thereof to be coupled with the sleeve; and
    the sleeve includes a hook portion which enters the second coupling groove and is deformed to be caught at the second coupling groove.

2. The device of claim 1, wherein the sleeve includes a shoulder portion which extends from the opening, and the stopper member includes a step corresponding to the shoulder portion.

3. The device of claim 2, wherein:
    the bore includes a lower bore in which a lower portion of the sleeve is accommodated and an upper bore in which the shoulder portion of the sleeve is accommodated;
    inner diameter of the lower bore is provided to be smaller than inner diameter of the upper bore; and
    a space through which the brake oil is introduced and discharged is formed between the sleeve and the upper bore in a region in which the inport and the outport are provided.

4. The device of claim 1, wherein:
    a concave-convex portion is formed on an outer circumferential surface of the damping member in a longitudinal direction; and
    an auxiliary damping space is formed between the sleeve and the concave-convex portion.

5. The device of claim 4, wherein the stopper member includes a first coupling portion which is coupled to the damping member for sealing the damping space and a second coupling portion which is coupled to the sleeve for sealing between the damping space and the auxiliary damping space.

6. The device of claim 5, wherein the damping member is positioned under the second coupling portion.

7. The device of claim 1, wherein the stopper member includes:
    an insertion portion inserted into and coupled to a hollow portion of the damping member; and
    a cap portion integrally formed with the insertion portion and configured to block the one open end of the bore.

8. The device of claim 7, wherein:
at least one first coupling groove or first coupling protrusion is formed in an outer circumferential surface of the insertion portion; and
a coupling protrusion which fits the first coupling groove or a coupling groove which couples with the first coupling protrusion is formed on inner circumferential surface of the damping member into which the insertion portion is inserted.

9. The device of claim 1, wherein the damping member is formed of a rubber material to be elastically deformed.

10. The device of claim 1, wherein a flow path by which the inport and the outport are in communication with the damping space is formed in the stopper member.

11. The device of claim 10, wherein a space through which the brake oil is introduced and discharged is formed between the stopper member and the bore in a region in which the flow path passing through the stopper member is formed.

* * * * *